US010474535B2

United States Patent
Boucher et al.

(10) Patent No.: US 10,474,535 B2
(45) Date of Patent: *Nov. 12, 2019

(54) ASSET BROWSING AND RESTORATION OVER A NETWORK USING ON DEMAND STAGING

(71) Applicant: Longsand Limited, Cambridge (GB)

(72) Inventors: Mike Boucher, Southborough, MA (US); Joseph S Ficara, Southborough, MA (US)

(73) Assignee: LONGSAND LIMITED, Cambridge (GB)

( * ) Notice: Subject to any disclaimer, the term of this patent is extended or adjusted under 35 U.S.C. 154(b) by 282 days.

This patent is subject to a terminal disclaimer.

(21) Appl. No.: 15/032,397

(22) PCT Filed: Nov. 1, 2013

(86) PCT No.: PCT/US2013/068024
§ 371 (c)(1),
(2) Date: Apr. 27, 2016

(87) PCT Pub. No.: WO2015/065470
PCT Pub. Date: May 7, 2015

(65) Prior Publication Data
US 2016/0259691 A1    Sep. 8, 2016

(51) Int. Cl.
*G06F 11/14* (2006.01)
*G06F 9/50* (2006.01)
*H04L 29/08* (2006.01)

(52) U.S. Cl.
CPC ........ *G06F 11/1451* (2013.01); *G06F 9/5072* (2013.01); *H04L 67/10* (2013.01)

(58) Field of Classification Search
CPC ............. G06F 11/1451; G06F 11/1448; G06F 11/1446; G06F 11/1402; G06F 9/5072; G06F 9/5061; G06F 9/50; H04L 67/10
See application file for complete search history.

(56) References Cited

U.S. PATENT DOCUMENTS 5,941,951 A     8/1999  Day et al.
6,332,163 B1 *  12/2001 Bowman-Amuah ......................
                                              H04L 12/4604
                                              709/217

(Continued)

FOREIGN PATENT DOCUMENTS

EP          1923797         5/2008

OTHER PUBLICATIONS

Baer, B., "Introduction to Shredded Storage in Sharepoint 2013," (Web Page), Nov. 12, 2012, 4 pages, available at http://blogs.technet.com/b/wbaer/archive/2012/11/12/introduction-to-shredded-storage-in-sharepoint-2013.aspx.

(Continued)

*Primary Examiner* — Jay A Morrison
*Assistant Examiner* — Antonio J Caiado

(57) ABSTRACT

Example embodiments relate to asset browsing and restoration over a network using on demand staging. A method may include accessing, by a storage access system, a first portion of a compound asset in a storage system and restoring it as a staged asset in a staging area of the storage access system. The accessing and restoring of the first portion may be performed on demand in response to an indication from a client device to browse a portion of the compound asset. The method may further include accessing the internal structure of the staged asset to generate an asset directory. The asset directory may indicate discrete items within the compound asset. The method may further include providing the asset directory to the client device over a (Continued)

network, and receiving an indication from the client device of at least one of the discrete items to restore to the client device.

13 Claims, 3 Drawing Sheets

(56) References Cited

U.S. PATENT DOCUMENTS

| | | | |
|---|---|---|---|
| 6,581,045 B1* | 6/2003 | Watson | G06Q 30/0283 705/400 |
| 6,654,029 B1* | 11/2003 | Chiu | G06T 1/00 715/717 |
| 6,671,801 B1 | 12/2003 | Prakash | |
| 7,117,259 B1* | 10/2006 | Rohwer | H04L 65/4069 709/223 |
| 7,149,859 B2 | 12/2006 | Fujibayashi | |
| 7,158,479 B1 | 1/2007 | Noble | |
| 7,225,249 B1* | 5/2007 | Barry | G06F 17/3089 709/227 |
| 7,313,579 B2* | 12/2007 | Murotani | G06F 17/30067 |
| 7,426,499 B2 | 9/2008 | Eder | |
| 7,574,418 B1* | 8/2009 | Patterson | G06F 11/1451 |
| 7,865,519 B2* | 1/2011 | Stuhec | G06Q 30/08 707/771 |
| 7,974,965 B2* | 7/2011 | Woolf | G06F 17/30566 707/707 |
| 8,086,646 B2* | 12/2011 | Stuhec | G06Q 10/06 707/793 |
| 8,135,723 B2* | 3/2012 | Vaid | G06F 9/5066 707/755 |
| 8,166,038 B2* | 4/2012 | Kaufman | G06F 17/30997 380/45 |
| 8,214,336 B2* | 7/2012 | Cohen | G06F 17/30011 707/661 |
| 8,473,531 B2 | 6/2013 | Wade et al. | |
| 8,768,973 B2* | 7/2014 | Hagenbuch | G06F 9/5083 707/803 |
| 8,856,128 B2* | 10/2014 | Zasman | G06F 17/30011 707/737 |
| 9,128,946 B2* | 9/2015 | McGeehan | G06F 17/30115 |
| 9,652,346 B2* | 5/2017 | Wall | G06F 11/2094 |
| 9,727,628 B2* | 8/2017 | Stading | G06F 17/3043 |
| 2003/0046282 A1 | 3/2003 | Carlson et al. | |
| 2003/0110188 A1* | 6/2003 | Howard | G06F 17/30126 |
| 2004/0172318 A1* | 9/2004 | Shen | G06Q 40/00 705/35 |
| 2004/0267831 A1* | 12/2004 | Wong | G06F 17/30197 |
| 2005/0137983 A1* | 6/2005 | Bells | G06F 21/10 705/51 |
| 2005/0193269 A1* | 9/2005 | Haswell | G06F 11/3684 714/38.13 |
| 2005/0222933 A1* | 10/2005 | Wesby | G06Q 40/00 705/36 R |
| 2006/0178954 A1 | 8/2006 | Thukral et al. | |
| 2006/0179076 A1 | 8/2006 | Weber et al. | |
| 2006/0230244 A1* | 10/2006 | Amarendran | G06F 3/0619 711/162 |
| 2007/0185879 A1 | 8/2007 | Roublev et al. | |
| 2007/0260621 A1* | 11/2007 | Smolen | G06F 16/2308 |
| 2007/0271273 A1* | 11/2007 | Cradick | G06F 11/3636 |
| 2008/0005194 A1* | 1/2008 | Smolen | G06F 16/2308 |
| 2008/0263103 A1* | 10/2008 | McGregor | G06F 21/6218 |
| 2008/0263610 A1 | 10/2008 | Murray et al. | |
| 2009/0089254 A1 | 4/2009 | Von Kaenel et al. | |
| 2009/0300173 A1* | 12/2009 | Bakman | G06F 11/008 709/224 |
| 2010/0010968 A1* | 1/2010 | Redlich | G06Q 10/00 707/E17.014 |
| 2010/0150122 A1* | 6/2010 | Berger | H04W 4/90 370/338 |
| 2010/0312805 A1 | 12/2010 | Noonan | |
| 2011/0055298 A1* | 3/2011 | Wade | G06F 11/1435 707/827 |
| 2011/0131495 A1 | 6/2011 | Bull et al. | |
| 2011/0138025 A1* | 6/2011 | Kobi | G06F 9/50 709/221 |
| 2011/0145526 A1* | 6/2011 | Parham | G06F 3/061 711/162 |
| 2011/0258049 A1* | 10/2011 | Ramer | G06F 17/30867 705/14.66 |
| 2011/0320956 A1* | 12/2011 | Singh | G06Q 30/0241 715/747 |
| 2012/0221668 A1 | 8/2012 | Chen et al. | |
| 2012/0221696 A1 | 8/2012 | Ferris | |
| 2012/0309515 A1 | 12/2012 | Chung et al. | |
| 2013/0006945 A1 | 1/2013 | Prahlad et al. | |
| 2013/0041808 A1 | 2/2013 | Pham et al. | |
| 2013/0085999 A1* | 4/2013 | Tung | G06F 11/1451 707/654 |
| 2013/0204872 A1* | 8/2013 | Runchey | G06F 17/30283 707/736 |
| 2013/0232122 A1 | 9/2013 | Fitzgerald et al. | |
| 2013/0238572 A1* | 9/2013 | Prahlad | G06F 16/1844 707/692 |
| 2013/0263119 A1 | 10/2013 | Pissay et al. | |
| 2013/0263289 A1* | 10/2013 | Vijayan | G06F 21/60 726/31 |
| 2014/0250093 A1 | 9/2014 | Prahlad et al. | |
| 2015/0024852 A1 | 1/2015 | Pacey et al. | |
| 2018/0084306 A1* | 3/2018 | Hunter | H04H 60/31 |
| 2018/0121530 A1 | 5/2018 | McGregor et al. | |

OTHER PUBLICATIONS

Bowker, M. et al., "The Data Center of the Future," (Research Paper), Enterprise Strategy Group, White Paper, Mar. 2010, 9 pages, available at http://www.cristie.co.uk/uploads/media/ESG_wp_The_Data_Center_of_the_Future.pdf.

International Search Report & Written Opinion received in PCT Application No. PCT/US2013/1068024, dated Aug. 7, 2014, 9 pages.

International Search Report & Written Opinion received in PCT Application No. PCT/US2013/068007, dated Aug. 5, 2014, 12 pages.

Campbell, et al., "Asset Management Excellence", Second Edition CRC Press, 2011, 472 pages.

* cited by examiner

ASSET BROWSING AND RESTORATION OVER A NETWORK USING ON DEMAND STAGING

BACKGROUND

Cloud computing may refer to a computing model where resources (e.g., computing, storage, etc.) are maintained in data centers and provided to remote clients. As one example, a data center may provide virtual machines and related storage (e.g., virtual machine disks or VMDKs) to be used by remote clients. Clients may communicate with the cloud computing environment, for example, to configure their virtual machines and or to access their VMDKs. As another example, clients may backup their data (e.g., files, VMDKs, archive files, etc.) to a data center and may access or restore that data at a later time. Clients may communicate with the cloud computing environment via a network such as the internet, and via a software program, web interface or the like. Such cloud computing environments may be hosted by third parties or vendors, perhaps referred to as hosting organizations. Such hosting organizations may operate large data centers and clients may buy or lease resources (e.g., storage space, virtual machines, etc.) from them. The hosting organizations may (e.g., in the background) virtualize computing resources (e.g., storage disks or the like) to present them to the clients as logical components (e.g., logical storage volumes). In the case of storage resources, the resources may be physically distributed, meaning that, for example, a logical storage volume presented to a client may actually include multiple storage drives or portions of storage drives that span across multiple computing devices (e.g., servers, storage drives, storage racks, etc.) of the hosting organization.

BRIEF DESCRIPTION OF THE DRAWINGS

The following detailed description references the drawings, wherein.

DETAILED DESCRIPTION

Figure 1:
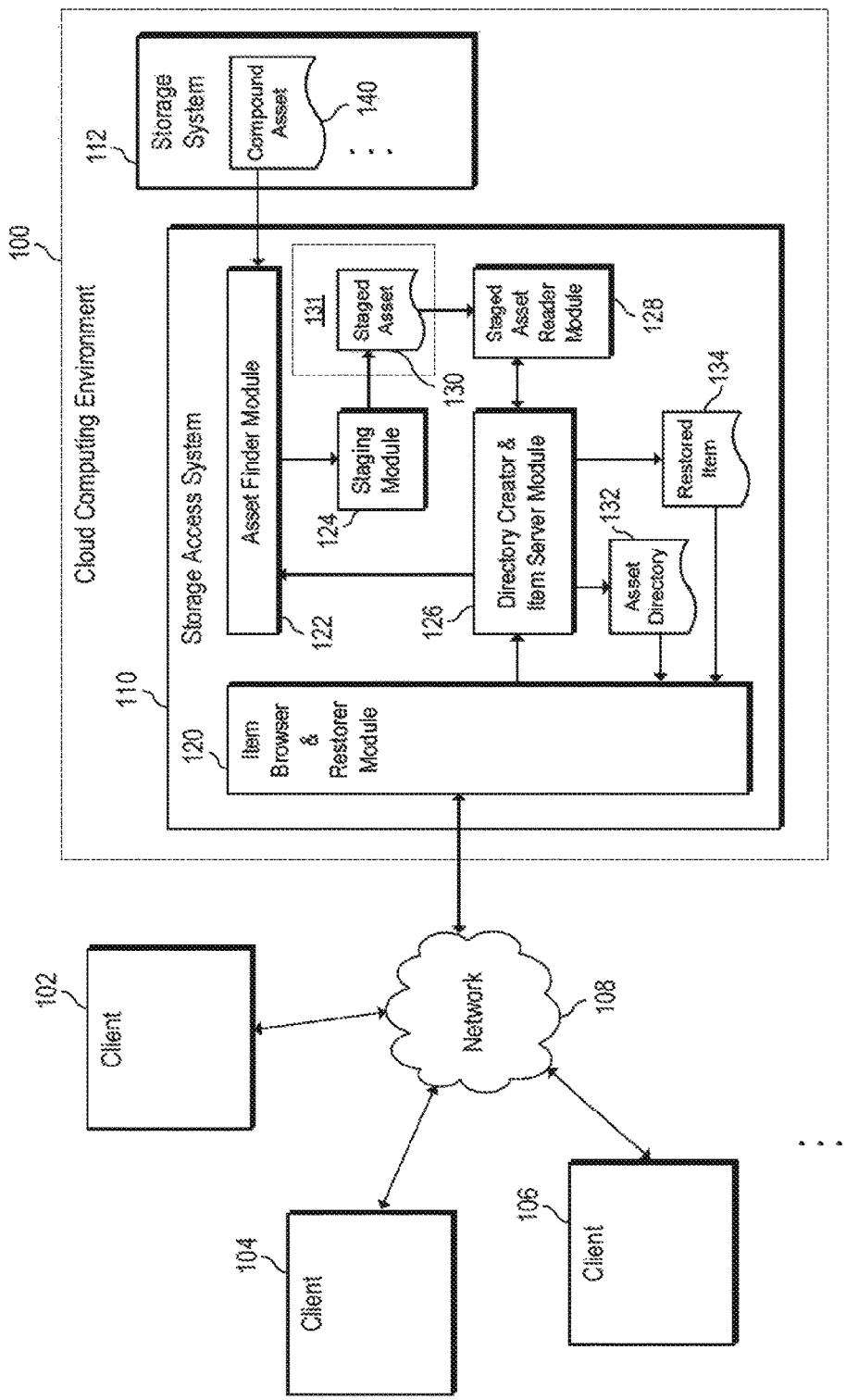
FIG. 1 is a block diagram of an example cloud computing environment that may facilitate asset browsing and restoration over a network.

Various hosting organizations may store data of clients as compound assets, meaning that multiple discrete items of data for a particular client may be packaged and stored as a single asset. For example, a client may own or lease a virtual machine disk (VMDK) in a data center of a hosting organization where the VMDK represents a disk of a virtual machine also owned or leased by the client. Such a VMDK may have, for example, lived in the data center from its inception, or, as another example, the client may have sent an existing VMDK to the data center, e.g., for backup. Such a VMDK may be one example of a compound asset. As another example of a compound asset, a hosting organization may store an archived file (e.g., a .zip file) and/or encrypted file of a client, where such a file is a compound asset. Such a file may have been backed up by the client to the hosting organization. Thus, a compound asset of a user may exist within the cloud computing environment of the hosting organization. A compound asset may include multiple discrete items of data. Here, the term "include" may be used to mean that the compound asset may be interpreted as or deconstructed to reveal multiple discrete items, such as files. Thus, in the example of the VMDK, files making up the file system of the VMDK may be examples of discrete items. In the example of the .zip file or encrypted file, component files that were originally added to the .zip file or encrypted file before compression or encryption were performed may be examples of discrete items.

Storing a client's data as a compound asset may offer various benefits, for example, such as data compression and data encryption. In some situations, a compound asset may be a file type that is usable by some other resource of the cloud computing environment, for example, a VMDK file being usable by a virtual machine. Additionally, storing a client's data as a compound asset may allow the client to perform a high-speed complete restore of the client's entire store of data. Compound assets may be stored in a cloud computing environment in a way such that a particular compound asset may span across multiple computing devices (e.g., servers, storage drives, storage racks, etc.) of the hosting organization. For example, a portion of the data (e.g., bytes) that makes up a compound asset may be stored in one storage drive in one storage rack, and another portion of the data for the same compound asset may be stored in another storage drive of another storage rack. Even within the same storage drive, portions of data for a particular compound asset may not be stored contiguously.

Clients with data stored in cloud computing environment may desire to browse and/or restore their data to the client's remote computing device at some point. In some situations, where a client's data is stored as a compound asset, the client may desire to restore only one or a few discrete items of data instead of all the items in the compound asset. To restore a discrete item from a compound asset, some hosting organizations may require the client to restore the entire compound asset to the client's computing device and then "walk through" (e.g., using a file system on the client's computing device) the compound asset to access the individual items within it. Among other issues, this may require unnecessary time and bandwidth for restoration because the entire compound asset may be sent over the network (e.g., a high-latency network) to the client. Alternative, some hosting organizations may individually store/backup each of the discrete items (e.g., shredding) in addition to storing/backing up the compound asset. The term "shredding" may refer to identifying and extracting all of the discrete items within a compound asset and protecting them so they can be individually retrieved. Backing up both the discrete items and the entire compound asset may allow clients to restore particular discrete items while still allowing the clients to perform a full fidelity restoration (i.e., performing a high-speed complete restore of the client's entire store of data). However, among other issues, backing up both the discrete items and the compound asset may result in the need for increased storage space.

The present disclosure describes improved asset browsing and restoration over a network (e.g., a high-latency network) using on demand staging. According to the present disclosure, clients may be able to restore a discrete item of a compound asset without restoring the entire compound asset. Thus, only discrete items that are requested to be restored are sent over the network. Additionally, such restoration may be performed without requiring shredding of the compound asset. Thus, only the compound asset may need to be stored in the cloud computing environment. According to the present disclosure, in a cloud computing environment, at least a portion of a compound asset may be restored (e.g., temporarily) to a staging area. The internal structure of the staged asset may be accessed (e.g., using an API) to generate an asset directory, which may be provided to a client over the network. The asset directory may indicate discrete items within the compound asset. The cloud computing environment may then receive a request from the client indicating at least one of the discrete items to be restored. The cloud computing environment may then access (e.g., using the API) the internal structure of the staged asset to generate at least one restored item and provide it to the client. At some point, the staged asset in the staging area may be deleted or removed.

The present disclosure may satisfy at least two data restoration goals—the ability to restore discrete items, and the ability to perform a full fidelity restoration. At the same time, storage space required by the cloud computing environment may be reduced because only the compound asset may need to be stored long term. Because an asset directory is generated based on the compound asset, clients may still quickly navigate the compound asset and quickly identify discrete items within the compound asset. Because the internal structure of the staged asset may be accessed to extract requested discrete items, and because only these items are sent to the client over the network (e.g., a high-latency network), restoration time and bandwidth is improved.

FIG. 1 is a block diagram of an example cloud computing environment 100 that may be in communication with a number of clients (e.g., 102, 104, 106) via a network (e.g., 108). Network 108 may be any wired and/or wireless network, and may include any number of hubs, routers, switches or the like. Network 108 may be, for example, part of the internet, at least one intranet and/or other type(s) of network(s). In some examples, network 108 may be a high-latency network, meaning that users may experience a noticeable delay between the sending and receiving of data. Clients 102, 104, 106 may each be any computing device, virtual machine or the like that is capable of communicating with a cloud computing environment (e.g., 100) over a network (e.g., 108). Each client may run a software program, web browser (e.g., to connect to a web interface provided by the cloud computing environment) or the like to allow a user of the client to access the cloud computing environment. Via such a software program or web interface, each client may send data (e.g., VMDK files, archived files, etc.) to the cloud computing environment 100, e.g., for backup. Additionally, via such a software program or web interface, each client may access and configure resources that they own or lease in the cloud computing environment 100. For example, each client may restore (e.g., download) data from cloud computing environment 100. The terms "client" and "user" may be used in similar contexts, but may be different. The term client may refer to a physical computing device, virtual machine or the like, whereas the term user may refer to the individual (e.g., human) that is interacting with the client, for example, to restore the user's data. Various descriptions herein may refer to a client or user performing a task, and it should be understood that if a client performs a task, a related user may have caused such a task to be performed. Likewise, if a user performs a task, a related client may actually perform the task based on the user's input. Thus, descriptions that mention client or user may be interpreted in a flexible manner.

Cloud computing environment 100 may include a storage access system 110 and a storage system 112. Storage access system 110 may handle requests from clients (e.g., 102, 104, 106), for example, requests to browse and/or restore data. Storage access system 110 may communicate with at least one storage system 112, for example, to access at least one compound asset (e.g., 140). Storage access system 110 may also allow clients to access and configure other resources (e.g., virtual machines) of cloud computing environment 100; however, for ease of description, system 110 is described and labeled in a storage-related manner. Storage access system 110 may be at least one computing device (e.g., server) that is capable of communicating with at least one client (e.g., 102, 104, 106) and accessing at least one storage system (e.g., 112). In some embodiments of the present disclosure, storage access system 110 may include more than one computing device. In other words, the components shown in storage access system 110 (e.g., modules, repositories, inputs, outputs, etc.) in FIG. 1 may be, but need not be, distributed across multiple computing devices, for example, computing devices that are in communication with each other via a network. In these embodiments, the computing devices may be separate devices, perhaps geographically separate. Thus, the term system may be used to refer to a single computing device or multiple computing devices that operate together to provide a service.

Storage access system 110 may include a number of modules (e.g., 120, 122, 124, 126, 128). Each of these modules may include a series of instructions encoded on a machine-readable storage medium (e.g., 320 of FIG. 3) and executable by a processor (e.g., 310) of a storage access system (e.g., 300). In addition or as an alternative, each module may include one or more hardware devices including electronic circuitry for implementing the functionality described below. With respect to the modules described and shown herein, it should be understood that part or all of the executable instructions and/or electronic circuitry included within one module may, in alternate embodiments, be included in a different module shown in the figures or in a different module not shown. Storage access system 110 may include a number of pieces of data (e.g., 130, 132, 134). Each of these pieces of data may be stored (e.g., temporarily) in storage access system 110 (e.g., in volatile or non-volatile memory). In some examples, each of these pieces of data may be stored on a storage device that is external to storage access system 110, for example, a storage device in storage system 112, or some other storage device in cloud computing environment 100.

Item browser & restorer module 120 may allow at least one client (e.g., 102, 104, 106) to interact with storage access system 110. Module 120 may handle requests to browse and/or restore data. The term "request" may refer to signals or indications that are generated as a client interacts with module 120.

As one specific example, module 120 may provide clients with a user interface (e.g., a web interface) that may allow users of the particular clients to browse data (e.g., files) in the cloud computing environment. The user interface may provide a visual tree-like structure where high level directories, folders or containers are represented with a particular icon (e.g., a folder icon) and where sub-directories/folders/containers within other directories/folders/containers are represented with different icons or with differently positioned icons or the like. The user interface may allow a user to click on certain icons or hyperlinks, for example, to navigate or drill-down into various directories/folders/containers. Such clicks or navigation may generate browsing "requests" that may be used by other modules (e.g., module 122) of the storage access system 110, e.g., to determine compound assets or portions of compound assets to find, retrieve and/or restore. Continuing with this specific example, files or data that are contained within a particular directory/folder/container may be indicated with particular icons (e.g., a document icon) as well. Then, users may be able to select particular files or data, and then indicate that such files/data should be restored. Such selections and indications may generate restoration "requests" that may be used by other modules (e.g., module 122) of the storage access system 110, e.g., to determine compound assets or portions of compound assets to find, retrieve and/or restore. In some examples, module 120 may include a physical piece of hardware or electronic circuitry that is used to serve user interface features to clients.

As another example, module 120 may provide clients with the data necessary to build or populate a user interface, and the client may generate its own user interface from data sent to it by module 120. In this situation, module 120 may not directly provide the user interface to the client. Instead module 120 may provide data (e.g., directory-tree data) to the client. Then, the client may navigate or drill-down into various directories/folders/containers and select particular files or data to be restored via the client-generated user interface. Such navigations, selections and indications may cause the client-generated user interface to send signals back to module 120, which may then cause module 120 to generate browsing or restoration "requests" that may be used by other modules (e.g., module 122) of the storage access system 110.

Item browser & restorer module 120 may cause various other modules (e.g., modules 122, 126) to perform various functions, for example, in response to a user browsing or navigating their data (e.g., a tree-like structure). As one particular example, when a user communicates with module 120, module 120 may indicate to module 126 that it should access at least one compound asset, and in turn, module 122 may retrieve (e.g., from storage system 112) at least one compound asset (e.g., 140) that is associated with the user. As described in more detail below, once a compound asset is found, it may be staged (e.g., by module 124). In some examples, the entire compound asset may not be staged all at once, and in these examples, when a user browses or navigates through their data (e.g., drilling further down the tree or into different directories/folders), module 120 may, in response, cause module 126 and 122 to identify and retrieve particular portions or parts of the appropriate compound asset.

Item browser & restorer module 120 may communicate with directory creator and item server module 126 to receive information in response to requests from clients. Then, module 120 may provide such information to the requesting client (e.g., client 102). For example, module 120 may receive an asset directory (e.g., 132) from module 126, for example, in response to a user browsing or navigating their data via module 120. The asset directory (e.g., a tree-like structure) may update (e.g., on demand or on the fly) as the user continues to navigate, and thus the information provided to the client may update as well. As another example, module 120 may receive at least one restored item (e.g., 134), for example, in response to a user requesting that a discrete item be restored.

Storage system 112 may be any collection of at least one storage device (e.g., hard drive, optical drive, tape drive or the like). Storage system 112 may include at least one storage controller that may service storage requests and distribute storage requests across the at least one storage device of the storage system 112. Storage system 112 may include one or more enclosures that house the at least one storage devices. For example, an enclosure may be a storage rack that houses at least one storage controller and/or multiple hard drives. In some examples, storage system 112 may include multiple enclosures (e.g., storage racks). In some examples, storage system 112 may be part of (e.g., within the same enclosure as) storage access system.

Storage system 112 may store at least one compound asset (e.g., 140), for example, a compound asset that includes multiple component pieces of data (e.g., files). In other words, compound asset 140 may be interpreted as or deconstructed into multiple discrete items. Compound asset 140 may be stored in a way such that it spans across multiple computing devices and/or storage devices (e.g., storage racks, storage drives, etc.) of storage system 112. For example, a portion of the data (e.g., bytes) that makes up compound asset 140 may be stored in one storage drive in one storage rack, and another portion of the data for compound asset 140 may be stored in another storage drive of another storage rack. Even within the same storage drive, portions of data for compound asset 140 may not be stored contiguously. Compound asset 140 may be any type of larger data piece that is made up of multiple component pieces of data. For example, compound asset 140 may be a virtual machine disk (VMDK) that includes multiple component files, e.g., organized by a file system of the VMDK. As another example, compound asset 140 may be a .zip file that includes multiple component files, perhaps in a compressed format. As another example, compound asset 140 may be an archive or database that includes multiple files either in a compressed or uncompressed format.

Asset finder module 122 may find and retrieve compound assets (e.g., 140) from at least one storage system (e.g., 112). In some examples, asset finder module may find and retrieve at least one portion or part of a compound asset. Asset finder module 122 may pass retrieved compound assets or parts of compound assets to staging module 124 such that module 124 may restore (e.g., temporarily) the compound asset or part. In some examples, a request of a user (e.g., via module 120) may not require asset finder module 122 to retrieve new data from storage system 112. For example, as described in more detail below, in some examples, a user may in some situations only desire to navigate their data and see what files are backed up. In such a situation, an asset directory that is saved in the storage access system 110 may be used to service such a request. Asset finder module 122 may, at various times, receive an indication from module 126 that a user request (e.g., browsing request or restoration request) was received (e.g., from module 120) and that data should be retrieved from storage system 112.

In some examples, asset finder module 122 may be referred to as an asset finder. In one particular example, the term asset finder may refer to examples where asset finder module 122 is at least one hardware device that includes electronic circuitry for implementing the functionality of module 122 as described herein. In some examples, staging module 124 may be referred to as an asset stager. In one particular example, the term asset stager may refer to examples where staging module 124 is at least one hardware device that includes electronic circuitry for implementing the functionality of module 124 as described herein.

Asset finder module 122 may, in some examples, find and retrieve portions or parts of compound assets on the fly or on demand based on indications from module 126. The indications from module 126 may vary in their granularity, that is, module 126 may indicate that more data be retrieved than is necessary to service the client request (coarser granularity), or module 126 may indicate that only precise data needed to service the request be retrieved (finer granularity). As one example, in a cache-based approach, as a user navigates their data, e.g., by viewing a tree-like structure and interacting with module 120, it may be more or less likely that the user will select to restore items from various portions of the compound asset. Thus, module 126 may indicate that data be retrieved to service the request and likely future requests. In other examples, asset finder module 122 may retrieve portions or parts of a compound asset, on the fly, at an even finer granularity than the cache-based example. In these examples, asset finder module 122 may retrieve only the precise data (e.g., bytes) that is requested by the user. This may be referred to as a filter based approach (or filter driver approach).

Asset finder module 122 may, when retrieving a compound asset (e.g., 140) or a portion of a compound asset, configure the component portions of data (e.g., bytes) such that they are contiguous and sequential. As described above, a compound asset may be stored (e.g., in storage system 112) in a way such that it spans across multiple computing devices and/or storage devices of the storage system. Additionally, the compound asset may be stored according to a version control routine where a base compound asset is stored and then changes to the base asset are stored as "deltas" to the base asset. Asset finder module 122 may locate the necessary component data portions to retrieve the requested compound asset (or part) and may assemble a continuous, sequential chain of data to create a staged asset (e.g., 130) that can be read (e.g., by module 128) in a contiguous manner. A contiguous, sequential chain of data may be, for example, a configuration of data that resembles how the data of the compound asset was configured before it was stored in storage system 112. If the compound asset includes any "deltas," asset finder module 122 may also locate these deltas and apply the changes such that the contiguous chain of data is up to date. In some examples, the task of locating the necessary component data portions and assembling them into a contiguous chain of data, and perhaps applying deltas, may be performed in storage system 112, in which case, the data may already be in a contiguous format when returned to asset finder module 122.

Staging module 124 may receive a compound asset (e.g., 140) or a part of a compound asset that was retrieved by asset finder module 122. Staging module 124 may then restore the compound asset (or part), for example, by saving the compound asset (or part) in staging area 131. Staging area 131 may be a designated storage area, for example, in storage access system 110 or in some external storage system. The asset stored in staging area 131 may be referred to as a "staged asset," for example, staged asset 130. Staged asset 130 may include data that allows for discrete items (e.g., files) to be extracted and/or stated asset 130 may include directory information that indicates the discrete items that are included in compound asset 140. In some examples, staging module 124 may create an asset "stub" in staging area 131, where the asset stub serves as a data container or a storage starting point for the data of the staged asset (e.g., 130). This asset stub may be a storage location, address or other placeholder in staging area 131 that other modules (e.g., module 128) of storage access system 110 know where to look in order to access the staged asset 130. The asset stub may be of a file type that is the same as the file type of compound asset 140 and of the eventual staged asset 130. For example, compound asset may be a .zip file, and thus, the asset stub may be .zip file type container (e.g., an empty .zip file).

Staging module 124 may save or add data to the asset stub (e.g., on the fly) as staging module 124 receives the data from asset finder module 122. Such data may be a compound asset (or part) received from module 122. Continuing with the example from above, if compound asset 140 and staged asset 130 are of a .zip file type, staging module 124 may save or add a compound asset (e.g., of a .zip file type) or a part of a compound asset to an empty .zip asset stub in the staging area. At any point, the data found at the asset stub may be considered to be the staged asset 130. Thus, the difference between the asset stub and the staged asset may be that the asset stub is a location, address or container that data can be saved at or added to, and the staged asset may be the data that is currently in the container.

As another example, the "on the fly" addition of data to the asset stub may be explained. Assume for a moment that a user is browsing (e.g., via module 120) a tree representation of the user's data. The entire tree may represent the user's entire store of data (e.g., the entire directory of discrete items within compound asset 140), for example. The user may expand a portion of the tree, which may show a portion of the compound asset 140 as being accessible. In response to this expansion, asset finder module 122 may retrieve at least a portion of compound asset 140 (e.g., a portion that corresponds to at least part of a directory of the compound asset, or a portion that corresponds to the portion of the compound asset that is represented as accessible via the tree). This retrieved portion of the compound asset may be saved to or added to an asset stub (e.g., an empty .zip file) in staging area 131. At this point, the staged asset 130 may include this portion of the compound asset, e.g., stored as a contiguous, sequential chain of data. Then, at some point, a user request may cause asset finder module 122 to retrieve additional portions of the compound asset, and staging module 124 may add these retrieved portions to the asset stub, as part of the same staged asset.

Staged asset reader module 128 may be used to access the internal structure of staged asset 130, for example, to generate an asset directory (e.g., 132) or to create a restored item (e.g., 134). Staged asset 130 may be of a file type that may not be easily navigated (e.g., by a common file system) or may be of a proprietary file type. As one example, staged asset 130 may be encrypted and/or compressed. Staged asset reader module 128 may understand and may be able to read the file type of staged asset 130. Thus, staged asset reader module 128 may be able to read the internal structure of staged asset 130, for example, to see the individual items (e.g., files) that are included in the staged asset. In some examples, staged asset reader module 128 may be created by the same organization that manages the file type (e.g., file type standard) of staged asset 130.

Staged asset reader module 128 may be any module (e.g., software, hardware, firmware or the like) that can read and understand a particular type of file. For example, module 128 may be an application programming interface (API), for example, an API provided by the same organization that manages the file type standard of staged asset 130. As another example, module 128 may be a file system that knows how to detect the organization (e.g., via a file table or the like) of the staged asset 130, including the locations of the individual items (e.g., files) within the staged asset, and knows how to access the individual items based on the organization.

Staged asset reader module 128 may know the location (e.g., the address) of staged asset 130. More particularly, module 128 may know (e.g., may point to) the location of an asset stub (described in more detail above) in staging area 131, which may indicate the start of data that makes up staged asset 130. In this respect, staged asset reader module 128 may read whatever data has been saved at the asset stub, for example, by staging module 124. This data may be a full compound asset (e.g., based on compound asset 140) or a portion of a compound asset. Module 128 may then analyze the staged asset to determine the internal structure of the staged asset. For example, module 128 may analyze the data to look for a header and/or a file table. Then, module 128 may look for a directory of component items within the data. Module 128 may present this directory of items to other modules (e.g., module 126) of storage access system 110. Module 128 may also use this directory to extract the data of the individual items from staged asset 130. Module 128 may present one or more extracted pieces of data to other modules (e.g., module 126) of storage access system 110, for example, to create at least one restored item (e.g., 134).

Directory creator and item server module 126 may receive user requests (e.g., browsing requests and restoration requests) from module 120. Directory creator and item server module 126 may determine whether data needs to be retrieved from a storage system (e.g., 112) to service requests or whether they can be serviced without such retrieval, for example, if a browsing requests can be serviced using a directory that is stored in storage access system 110. If module 126 determines that data should be retrieved from a storage system, it may indicate as such to asset finder module 122.

Directory creator and item server module 126 may include a low level system or process, for example, to determine whether asset finder module 122 should retrieve data from a storage system (e.g., 112), and if so, at what granularity it should request the data. When module 126 receives a user request, module 126 may attempt a file system request (e.g., using module 128) to retrieve the required data locally. Module 126 may detect when such a file system requests is attempted to staging area 131, and may intercept such requests, e.g., if no appropriate staged asset exists in staging area 131. Module 126 may then indicate to asset finder module 122 that the data to service the request should be retrieved from a storage system (e.g., 112).

Module 126 may, when indicating to module 122 which data it should retrieve from the storage system, use a cache based approach (see above for an introduction). In some scenarios, as a user browses through their data, it may be more or less likely that the user will select to restore items from various portions of the compound asset. For example, if a user is viewing a particular directory or folder of files, it may be more likely that one of those file will be chosen for restoration. In this example, module 120 may send a browsing request (e.g., to module 126) for a portion of the compound asset that represents that directory or folder, and module 126 may send an indication to module 122 to retrieve that portion from storage system 112, and that portion may be staged (e.g., by module 124). In this respect, portions of the compound asset that include items that are likely to be chosen for restoration are always staged, and it may be unnecessary to stage the entire compound asset.

Module 126 may instead use a filter based approach (see above for an introduction). For the filter based approach, the low level system or process of module 126 may intercept file system requests for particular pieces of data (e.g., files) and may send indications to module 122, on demand, to retrieve only these specific requested pieces of data. For browsing requests, module 126 may indicate to module 122 to retrieve only the precise directory type information needed to display folder and file representations (e.g., icons) to the user. For restoration requests, module 126 may indicate to module 122 to retrieve only the precise discrete pieces of data (e.g., files) that need to be provided to the user. For this filter based approach, only the precise requested data may be provided to the staging module.

Directory creator and item server module 126 may communicate with staged asset reader module 128, for example, to receive information (e.g., internal structure and component items) about staged asset 130. Staged asset 130 may exist in staging area 131 as a result of a current user requests that is pending or as a result of information retrieved for a previous user request. As one example, module 126 may receive a user requests (e.g., a browsing request or a restoration request) and may determine that data needs to be retrieved from storage, and may indicate the same to module 122. Module 122 may then retrieve the required data (e.g., part of compound asset 140) from storage system 112 and may stage the data as staged asset 130. Module 126 may then communicate with module 128 to access the internal structure of staged asset 130. Based on this information, module 126 may generate an asset directory 132 and/or at least one restored item 134.

In some examples, at least a portion of module 126 (e.g., a portion responsible for creating asset directories like 132), and perhaps related modules like staged asset reader module 128 may be referred to as a directory creator. In one particular example, the term directory creator may refer to examples where the at least a portion of module 126 and related modules are hardware devices that include electronic circuitry for implementing the functionality of these modules described herein. In some examples, at least a portion of module 126 (e.g., a portion responsible for extracting and restoring discrete items like 134), and perhaps related modules like staged asset reader module 128 may be referred to as an item server. In one particular example, the term item server may refer to examples where the at least a portion of module 126 and related modules are hardware devices that include electronic circuitry for implementing the functionality of these modules described herein.

To generate asset directory 132, directory creator and item server module 126 may receive (e.g., from module 128) information that indicates the organization of the staged asset 130, including the hierarchy of the individual items (e.g., files) within the staged asset. Then, module 126 may package or format that information, for example, such that asset directory 132 includes directory information that can be easily understood by module 120, and presented to users. To generate restored item 134, directory creator and item server module 126 may receive at least one extracted piece of data from module 128. Then, module 126 may package or format that data such that restored item 134 is in a format that is readable by a file system or the like, for example, a file system of module 120. As one particular example, if module 126 may add appropriate headers to the extracted data to make the data appear as a discrete file to a file system.

At some point, staged asset 130 may be removed or deleted from storage access system 110. For example, directory creator and item server module 126 may cause staged asset 130 to be deleted. Staged asset 130 may be deleted based on various events, at various times and/or based on various internal heuristics that indicate that the staged asset is no longer needed. For example, staged asset 130 may be removed based on heuristics of past client specific usage patterns (e.g., data access patterns). As another example, staged asset 130 may be removed after a defined timeout period (e.g., a timeout period starting after the requested asset directory or restored item has been generated). As another example, staged asset 130 may be removed when a user logs off of or disconnects from the storage access system 110. As another example, staged asset 130 may be removed when a subsequent request comes in for a different asset directory or restored item (e.g., from a different compound asset). As another example, the staging area (described in more detail above) may have a limited storage size (e.g., based on customer classes), and if that storage size is met, one or more staged assets may be removed or deleted. Creating a staged asset and then removing the staged asset may allow for restoration of discrete items while preventing the need to increase storage space in the cloud computing environment 100 to store shredded versions of all compound assets.

Figure 2:
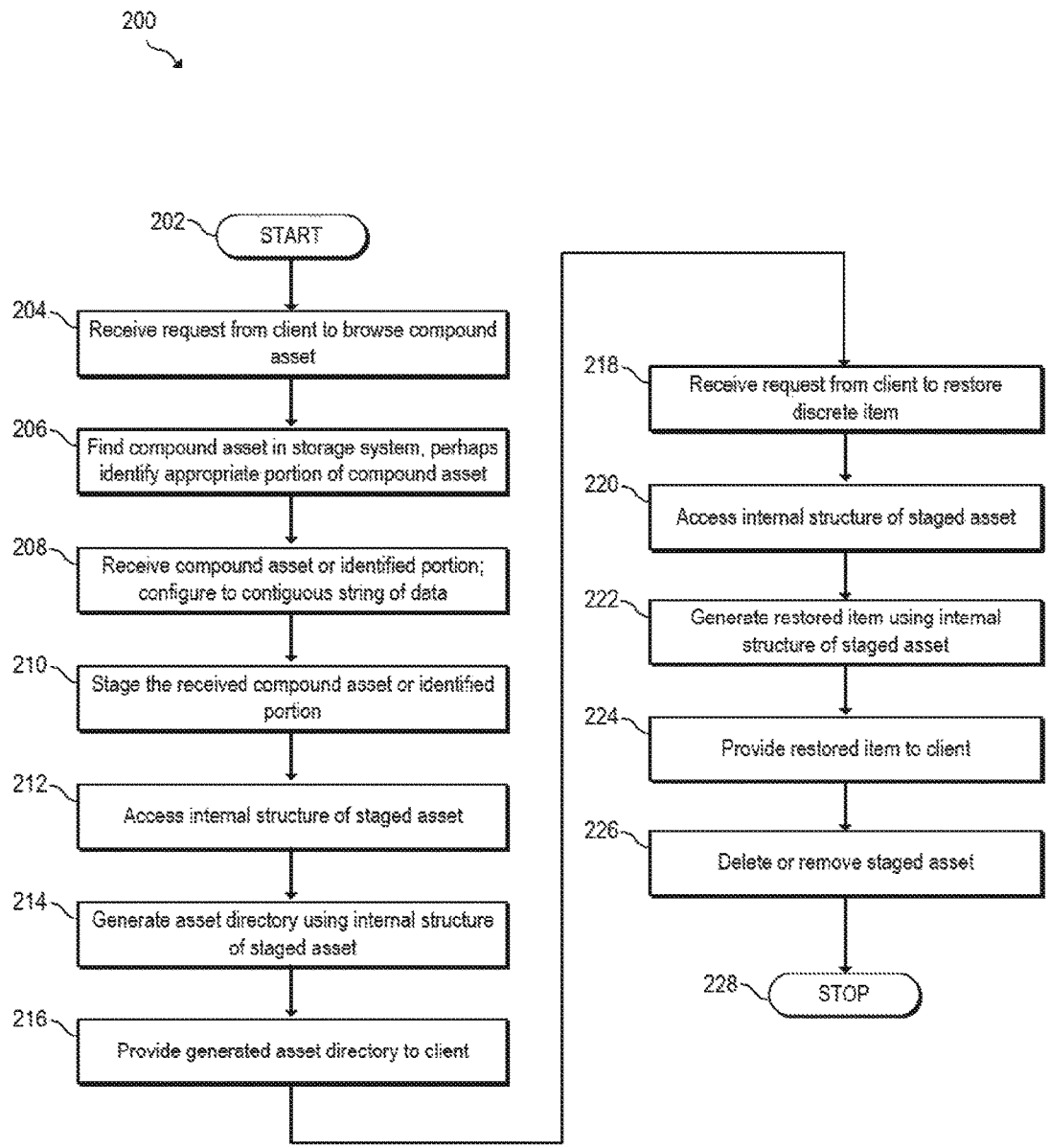
FIG. 2 is a flowchart of an example method for asset browsing and restoration over a network.

FIG. 2 is a flowchart of an example method 200 for asset browsing and restoration over a network using on demand staging. The execution of method 200 is described below with reference to a storage access system, which may be similar to storage access system 110 of FIG. 1, for example. Various other suitable systems or computing devices may execute method 200, for example, storage access system 300 of FIG. 3. Method 200 may be implemented in the form of executable instructions stored on a machine-readable storage medium, such as storage medium 320, and/or in the form of electronic circuitry. In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat.

Method 200 may start at step 202 and continue to step 204, where a storage access system (e.g., 110) may receive a request from a client (e.g., 102) to browse a compound asset (e.g., 140), for example, to view a directory of component discrete items. At step 206, (e.g., in response to the request from the client) the storage access system may find a compound asset (e.g., 140) in a storage system (e.g., 112). In some examples, the storage access system may identify a portion of the compound asset. At step 208, the storage access system may receive the requested compound asset or the identified portion. The storage access system may configure the received compound asset (or part) such that the data is in a contiguous sequential chain, as described above. In some examples, this configuration may be performed in the storage system. At step 210, (e.g., in response to receiving the requested compound asset or portion) the storage access system may stage (e.g., in staging area 131) the received compound asset or identified portion, as described above. At step 212, the storage access system may access the internal structure of the staged asset (e.g., 130), e.g., using an API (e.g., 128) or the like. The internal structure may provide a list or directory of discrete items within the compound asset. At step 214, the storage access system may generate an asset directory (e.g., 132) using the internal structure of the staged asset. At step 216, the storage access system may provide the generated asset directory (e.g., 132) to the client (e.g., 102), which may allow a user to browse the discrete items of the compound asset.

At step 218, the storage access system may receive a request from a client (e.g., 102) to restore a discrete item. For example, the client may select a discrete item included in the above mentioned directory (e.g., 132). At this point, the currently staged asset (e.g., 130) may include the data requested by the client, for example, if asset finder module 122 requests data that is likely to be restored based on the client's browsing requests, as described in more detail above. In this case, method 200 may proceed to step 220. If the currently staged asset does not include the data requested by the client, method 200 may include additional steps (e.g., steps similar to steps 206, 208, 210) in between step 218 and step 220 to stage the requested data (e.g., to update or overwrite staged asset 130). This may be the case if a filter based approach is used, as described in more detail above.

At step 220, the storage access system may access the internal structure of the staged asset (e.g., 130), e.g., using an API (e.g., 128) or the like. The internal structure may allow for extraction of discrete items, which may allow discrete items (e.g., those requested by the client at step 204) to be restored instead of restoring the entire compound asset. At step 222, the storage access system may generate a restored item (e.g., 134) using the internal structure of the staged asset. At step 224, the storage access system may provide the restored item (e.g., 134) to the client (e.g., 102). At step 226, the storage access system may delete or remove the staged asset (e.g., 130). At various steps (e.g., after step 224 and/or after step 226), method 200 may return to previous steps of method 200, for example, to step 204 or 218. This generally represents that the storage access system is at various times ready to receive additional requests from clients (e.g., the same client or different clients). Method 200 may eventually continue to step 228, where method 200 may stop.

Figure 3:
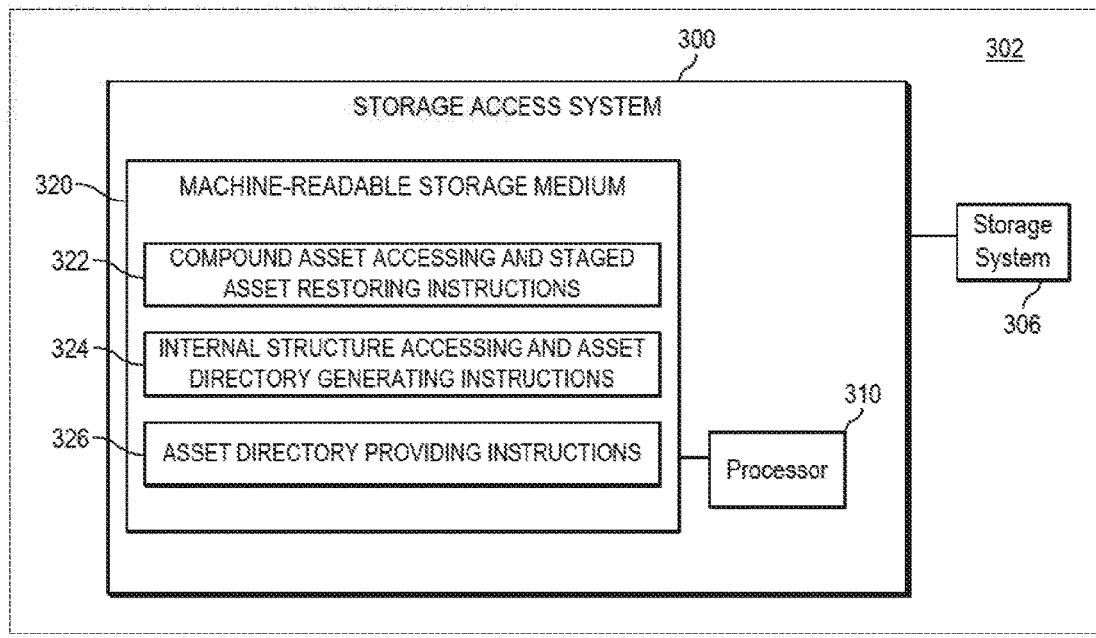
FIG. 3 is a block diagram of an example storage access system for asset browsing and restoration over a network.

FIG. 3 is a block diagram of an example storage access system 300 for asset browsing and restoration over a network using on demand staging. Storage access system 300 may be part of a cloud computing environment 302. Storage access system may be at least one computing device that is capable of communicating with at least one storage system (e.g., 306). More details regarding an example storage access system may be described above, for example, with respect to storage access system 110 of FIG. 1. In the embodiment of FIG. 3, storage access system 300 includes a processor 310 and a machine-readable storage medium 320.

Processor 310 may be one or more central processing units (CPUs), microprocessors, and/or other hardware devices suitable for retrieval and execution of instructions stored in machine-readable storage medium 320. In the particular embodiment shown in FIG. 3, processor 310 may fetch, decode, and execute instructions 322, 324, 326 to facilitate asset browsing and restoration over a network using on demand staging. As an alternative or in addition to retrieving and executing instructions, processor 310 may include one or more electronic circuits comprising a number of electronic components for performing the functionality of one or more of instructions in machine-readable storage medium 320. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 320 may be any electronic, magnetic, optical, or other physical storage device that stores executable instructions. Thus, machine-readable storage medium 320 may be, for example, Random Access Memory (RAM), an Electrically-Erasable Programmable Read-Only Memory (EEPROM), a storage drive, an optical disc, and the like. Machine-readable storage medium 320 may be disposed within storage access system 300, as shown in FIG. 3. In this situation, the executable instructions may be "installed" on the system 300. Alternatively, machine-readable storage medium 320 may be a portable (e.g., external) storage medium, for example, that allows storage access system 300 to remotely execute the instructions or download the instructions from the storage medium. In this situation, the executable instructions may be part of an "installation package". As described herein, machine-readable storage medium 320 may be encoded with executable instructions for asset browsing and restoration over a network using on demand staging.

Compound asset accessing and staged asset restoring instructions 322 may access a directory portion of the compound asset in a storage system and restore it as part of the staged asset in a staging area. The access and restoration of the directory portion may be performed on demand, e.g., in response to an indication from the client device to browse a portion of the compound asset. Internal structure accessing and asset directory generating instructions 324 may access the internal structure of the staged asset to generate an asset directory. The asset directory may indicate discrete items within the compound asset. Asset directory providing instructions may provide the asset directory to the client device over a network.

Figure 4:
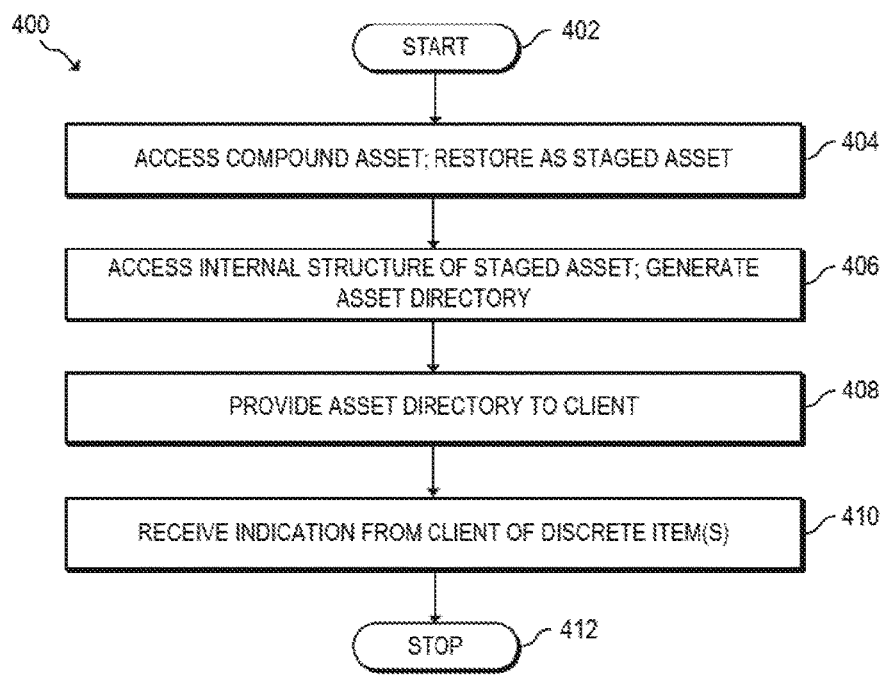
FIG. 4 is a flowchart of an example method for asset browsing and restoration over a network.

FIG. 4 is a flowchart of an example method 400 for asset browsing and restoration over a network using on demand staging. Method 400 may be described below as being executed or performed by storage access system 300; however, other suitable computing devices or systems may be used as well, for example, storage access system 110 of FIG. 1. Method 400 may be implemented in the form of executable instructions stored on a machine-readable storage medium, such as storage medium 320, and/or in the form of electronic circuitry. In alternate embodiments of the present disclosure, one or more steps of method 400 may be executed substantially concurrently or in a different order than shown in FIG. 4. In alternate embodiments of the present disclosure, method 400 may include more or less steps than are shown in FIG. 4. In some embodiments, one or more of the steps of method 400 may, at certain times, be ongoing and/or may repeat.

Method 400 may start at step 402 and continue to step 404, where a storage access system (e.g., 300) may access a first portion of a compound asset in a storage system and restore it as a staged asset in a staging area of the storage access system. The accessing and restoring of the first portion may be performed on demand, e.g., in response to an indication from a client device to browse a portion of the compound asset. At step 406, the storage access system may access the internal structure of the staged asset, e.g., to generate an asset directory. The asset directory may indicate discrete items within the compound asset. At step 408, the storage access system may provide the asset directory to the client device over a network. At step 410, the storage access system may receive an indication from the client device of at least one of the discrete items to restore to the client device. Method 400 may eventually continue to step 412, where method 400 may stop.

The invention claimed is:

1. A method executed in a storage access system for browsing and restoring assets of a storage system, the method comprising:

accessing a first portion of a compound asset in a storage system and restoring the first portion as a staged asset in a staging area of the storage access system, wherein the accessing and restoring of the first portion is performed on demand in response to a first indication from a client device to browse a portion of the compound asset;

accessing an internal structure of the first portion of the compound asset, further including:

detecting a staged asset organization including a hierarchy of discrete items within the first portion;

detecting a staged asset header or a staged asset file table for the first portion; and accessing information, utilizing the staged asset organization and the staged asset header or the staged asset file table for the first portion, relating to the discrete items within the first portion to determine the internal structure of the first portion;

generating an asset directory based on the internal structure of the first portion;

providing the asset directory to the client device over a network;

receiving a second indication from the client device of at least one of the discrete items to restore to the client device; and removing or deleting the staged asset from the storage access system subsequent to the at least one of the discrete items being provided to the client device.

2. The method of claim 1, wherein the staged asset includes data sufficient to respond to the second indication from the client device of the at least one of the discrete items within the compound asset to restore, the method further comprising:

accessing the internal structure of the staged asset to generate at least one restored item based on the second indication from the client device of the at least one of the discrete items within the compound asset to restore; and providing the at least one restored item to the client device over the network without providing all the data of the compound asset to the client device over the network.

3. The method of claim 1, further comprising:

accessing a second portion of the compound asset in the storage system and restoring it as a part of the staged asset in the staging area, wherein the accessing and restoring of the second portion is performed on demand in response to the second indication from the client device of the at least one of the discrete items within the compound asset to restore;

accessing the internal structure of the staged asset to generate at least one restored item; and providing the at least one restored item to the client device over the network without providing all data of the compound asset to the client device over the network.

4. The method of claim 1, wherein the removing or deleting of the staged asset is based on a defined timeout period.

5. The method of claim 3, wherein restoring the first portion as the staged asset in the staging area includes saving the first portion of the compound asset to an asset stub in the staging area.

6. The method of claim 1, wherein multiple component pieces of data of the compound asset are stored in the storage system across more than one storage device of the storage system or in a non-contiguous manner.

7. The method of claim 1, wherein the accessing the internal structure of the first portion is performed using an application programming interface (API).

8. A storage access system for asset browsing and restoration, the storage access system comprising:
a processor; and
a non-transitory computer readable medium storing machine readable instructions, wherein the processor executes the machine readable instructions to:
retrieve a first portion of a compound asset from the storage access system on demand in response to a first indication from a client device to browse a portion of the compound asset;
retrieve a second portion of the compound asset from the storage access system on demand in response to a second indication from a client device of at least one discrete item of the compound asset to restore;
save the first portion as a staged asset;
save the second portion as part of the staged asset;
access an internal structure of the first portion of the compound asset, wherein to access the internal structure, the processor:
detects a staged asset organization including a hierarchy of discrete items within the first portion;
detects a staged asset header or a staged asset file table for the first portion; and
accesses information, using the staged asset organization and the staged asset header or the staged asset file table for the first portion, relating to the discrete items within the first portion to determine the internal structure of the first portion;
generate an asset directory based on the internal structure of the first portion, wherein the asset directory indicates discrete items within the compound asset including the at least one indicated discrete item;
access the internal structure of the staged asset to generate at least one restored item; and
remove or delete the staged asset from the storage access system subsequent to the at least one restored item being provided to the client device.

9. The storage access system of claim 8, wherein the processor executes the machine readable instructions to:
cause the asset directory to be sent to the client device over a network, and wherein an item server causes the at least one restored item to be sent to the client device over the network without sending all data of the compound asset to the client device over the network.

10. A non-transitory computer-readable storage medium encoded with instructions executable by a processor of a storage access system for asset browsing and restoration, the non-transitory computer-readable medium comprising:
instructions to access a portion of a compound asset in a storage system and restore the portion of the compound asset as part of a staged asset in a staging area of the storage access system, wherein the access and restoration is performed on demand in response to a first indication from a client device of at least one discrete item of the compound asset to restore;
instructions to access an internal structure of the portion of the compound asset to generate at least one restored item related to the at least one discrete item, wherein the instructions to access the internal structure are further executable to:
detect a staged asset organization including a hierarchy of discrete items within the portion;
detect a staged asset header or a staged asset file table for the portion; and
access information, using the staged asset organization and the staged asset header or the staged asset file table for the portion, relating to the discrete items within the portion to determine the internal structure of the portion;
instructions to generate an asset directory based on the internal structure of the portion;
instructions to provide the at least one restored item to the client device over a network without providing all data of the compound asset to the client device over the network; and
instructions to remove or delete the staged asset from the storage access system subsequent to the at least one restored item being provided to the client device.

11. The non-transitory computer-readable storage medium of claim 10, further comprising instructions to determine the portion of the compound asset to access in the storage system by monitoring low level file system requests to the staging area, wherein the low level file system requests are attempted in response to the first indication from the client device of the at least one discrete item of the compound asset to restore.

12. The non-transitory computer-readable storage medium of claim 10, further comprising:
instructions to access a directory portion of the compound asset in a storage system and restore it as part of the staged asset in a staging area, wherein the access and restoration of the directory portion is performed on demand in response to a second indication from the client device to browse a portion of the compound asset;
and
instructions to provide the asset directory to the client device over a network.

13. The non-transitory computer-readable storage medium of claim 12, further comprising instructions to create an asset stub in the staging area, wherein the asset stub has a file type that is the same as the at least one restored item, wherein restoring the directory portion of the compound asset to the staging area includes saving the directory portion starting at the asset stub.

* * * * *